United States Patent
Arambepola et al.

(10) Patent No.: US 8,982,724 B2
(45) Date of Patent: Mar. 17, 2015

(54) SYSTEMS AND METHODS FOR IMPLEMENTING PEAK-TO-AVERAGE POWER RATIO REDUCTION FOR OFDMA MODULATION

(71) Applicants: Bernard Arambepola, Enfield (GB); Parveen Shukla, Nottingham (GB); Thushara Hewavithana, Hatfield (GB); Sahan Gamage, Cambridge (GB)

(72) Inventors: Bernard Arambepola, Enfield (GB); Parveen Shukla, Nottingham (GB); Thushara Hewavithana, Hatfield (GB); Sahan Gamage, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 161 days.

(21) Appl. No.: 13/716,534

(22) Filed: Dec. 17, 2012

(65) Prior Publication Data
US 2014/0169188 A1    Jun. 19, 2014

(51) Int. Cl.
*H04B 7/04* (2006.01)
*H04L 27/26* (2006.01)

(52) U.S. Cl.
CPC .................................. *H04L 27/2614* (2013.01)
USPC ........................................................ 370/252

(58) Field of Classification Search
None
See application file for complete search history.

(56) References Cited

U.S. PATENT DOCUMENTS

| | | | |
|---|---|---|---|
| 6,853,632 B1 * | 2/2005 | Verma et al. | 370/343 |
| 2004/0086054 A1 | 5/2004 | Corral | |
| 2005/0018702 A1 * | 1/2005 | Chen et al. | 370/431 |
| 2006/0115010 A1 * | 6/2006 | Rog et al. | 375/260 |
| 2007/0116142 A1 | 5/2007 | Molander | |
| 2007/0223393 A1 * | 9/2007 | Urushihara et al. | 370/252 |
| 2008/0101487 A1 * | 5/2008 | Muck et al. | 375/260 |
| 2009/0003308 A1 * | 1/2009 | Baxley et al. | 370/350 |
| 2009/0034408 A1 * | 2/2009 | Kim et al. | 370/210 |

(Continued)

FOREIGN PATENT DOCUMENTS

| | | |
|---|---|---|
| WO | 2008/092278 A1 | 8/2008 |
| WO | 2014/098978 A1 | 6/2014 |

OTHER PUBLICATIONS

Sudaha et al., Adaptive Companding as a PAPR Reduction Technique of an OFDM Signal, Nov. 2012, Journal of Communications, vol. 7, pp. 803-807.*

(Continued)

*Primary Examiner* — Hassan Kizou
*Assistant Examiner* — Tejis Daya
(74) *Attorney, Agent, or Firm* — Ellis B. Ramirez; Prass LLP

(57) ABSTRACT

A system and method are provided for implementing a peak-to-average power ratio (PAPR) reduction scheme for Orthogonal Frequency-Division Multiple Access (OFDMA) modulation. A unique PAPR reduction scheme for OFDMA modulation for systems operated according to a DOCSIS standard achieves results similar to those attributable to tone reservation schemes in a manner that does not negatively affect an amount of available data capacity, particularly in implementations with limited numbers of subcarriers. The disclosed systems and methods are particularly adaptable to next generation cable gateways and/or next generation cable modems. These next generation cable gateways and/or cable modems may find particular utility in advanced hybrid fiber/coaxial cable systems. The adaptable cable gateways/modems may include a cable gateway system-on-chip (SOC) configuration. The disclosed schemes may be applicable to OFDM modulation. For OFDM, however, the known tone reservation algorithms also may be employed.

30 Claims, 3 Drawing Sheets

(56) References Cited

U.S. PATENT DOCUMENTS

| | | | |
|---|---|---|---|
| 2009/0052577 A1* | 2/2009 | Wang | 375/299 |
| 2011/0182342 A1 | 7/2011 | Qu et al. | |
| 2011/0188613 A1* | 8/2011 | Dowling et al. | 375/320 |
| 2011/0216814 A1* | 9/2011 | Browning et al. | 375/219 |
| 2011/0317790 A1* | 12/2011 | Yokokawa et al. | 375/329 |
| 2012/0281733 A1* | 11/2012 | Tanaka et al. | 375/148 |
| 2012/0294346 A1* | 11/2012 | Kolze | 375/224 |
| 2013/0177093 A1* | 7/2013 | Kwon et al. | 375/261 |

OTHER PUBLICATIONS

Hussain, et al.,"Novel SLM Based Techniques for PAPR Reduction of OFDM", IEEE Region 10 Conference, Tencon, Hong Kong, Nov. 14-17, 2006, pp. 1-4.

International Search Report and Written Opinion received for PCT Patent Application No. PCT/US2013/046135, mailed on Oct. 7, 2013, 9 pages.

* cited by examiner

SYSTEMS AND METHODS FOR IMPLEMENTING PEAK-TO-AVERAGE POWER RATIO REDUCTION FOR OFDMA MODULATION

BACKGROUND

1. Field of the Disclosed Embodiments

This disclosure relates to systems and methods for implementing a peak-to-average power ratio (PAPR) reduction technique or scheme that may be particularly applicable for devices operating an Orthogonal Frequency-Division Multiple Access (OFDMA) modulation technique, including a next generation cable gateway and/or next generation cable modem, and/or a cable gateway system-on-chip (SOC), based on the DOCSIS standard.

2. Related Art

Much of the work in advancing communication technologies in recent years, particularly emphasizing higher data rates and transmission speeds, has focused on advances in wireless technology transmission and reception. Corresponding advances in communication capabilities and capacities for cable gateways and cable modems, and the technologies housed in these components, remain important. Consider that, for individual structures such as individual residential homes that include dispersed wireless networks internal to and throughout the structure, the wireless modem or modems deployed throughout the structure are likely connected to coaxial cables as a data transmission medium for the data to get to the structure where it is then disseminated throughout the structure wirelessly. In this regard, the cable backbone, which often includes some combination of fiber and coaxial cables (hybrid fiber/coaxial cable systems), forms a significant and equally important part of an overall broadband network system. In the hybrid fiber/coaxial cable systems, fiber transmission cables form a significant portion of the cable backbone, but the connections to individual structures and to the wireless modems deployed within those structures are often made using coaxial cables.

The standard by which data transmission by cable is defined is the Data Over Cable Service Interface Specification or DOCSIS. DOCSIS is an international telecommunications standard that permits, among other technologies, the addition of high-speed data transfer to an existing cable television (CATV) system. DOCSIS is employed, for example, by many cable television operators to provide Internet access over existing hybrid fiber/coaxial cable systems and network infrastructures. DOCSIS, therefore, defines the mechanism by which data is transmitted over cable transmission lines to individual structures and the devices and access points that may be housed in those structures.

The DOCSIS 3.0 standard regarding physical layer specifications was released in its latest revision on Nov. 17, 2011 (the first revision was issued on Aug. 4, 2006). DOCSIS 3.0 is generally a specification revision that realized significantly increased transmissions speeds, and introduced support for Internet Protocol version 6 (IPv6). Current cable systems based on the DOCSIS standard use the physical layer defined in the International Telecommunication Union (ITU) Recommendation J.83 Annexes A, B or C. This standard is based on single-carrier quadrature amplitude modulation (QAM) and the physical layer channel bandwidths of 6, 7 or 8 MHz. Current versions of DOCSIS specify that 64-level or 256-level QAM (64-QAM or 256-QAM) be used for modulation of the downstream data transmissions, using an ITU-T J.83-AnnexB standard for 6 MHz channel operation, and a DVB-C modulation standard for 8 MHz channel (EuroDOCSIS) operation. QAM represents a format by which digital data is transmitted over coaxial cables. Current standardization activities are exploring the use of Orthogonal Frequency Division Multiplexing (OFDM) for the downstream carrier modules and OFDMA for the upstream with individual OFDM carriers modulated with 1024-level or 4096-level QAM.

A DOCSIS architecture includes two primary components: a cable modem (CM) located at the end-user structure, and a cable modem termination system (CMTS) located, for example at the CATV head end. Cable systems supporting on-demand programming use a hybrid fiber/coaxial cable system. Fiber optic lines bring digital signals to nodes in the system where they are converted into RF channels and modem signals on coaxial trunk lines. DOCSIS is exploring mechanisms to further increase bit rates carried by the coaxial cable trunk lines.

OFDMA is a multi-user version of the popular OFDM digital modulation scheme. Multiple access is achieved in OFDMA by assigning subsets of carriers (subcarriers) to individual users allowing simultaneous low data rate transmission from several users. OFDMA, therefore, provides a simple and robust scheme to avoid multipath interference. OFDMA can achieve a higher multiple-input/multiple-output (MIMO) spectral efficiency due to providing flatter frequency channels than, for example, in systems incorporating Code Division Multiple Access (CDMA). OFDMA allows simultaneous low-data-rate transmission from several users with lower maximum transmission powers for low data rate users.

OFDMA operates roughly as follows. Based on feedback information about channel conditions, adaptive user-to-subcarrier assignment is implemented. If this assignment is done sufficiently fast, this further improves the OFDM robustness to fast fading and narrow-band co-channel interference, and makes it possible to achieve better system spectral efficiency. Different numbers of subcarriers can be assigned to different users to support different Quality of Service (QoS) levels.

OFDMA is highly suitable for broadband wireless networks due to certain advantages including scalability, MIMO adaptability, and advantageous use of frequency selectivity.

BRIEF DESCRIPTION OF THE DRAWINGS

Various exemplary embodiments of the disclosed systems and methods for implementing a PAPR reduction technique or scheme for OFDMA modulation in a next generation cable gateway and/or next generation cable modem based on the DOCSIS standard, according to this disclosure will be described, in detail, with reference to the following drawings, in which.

DETAILED DESCRIPTION OF THE DISCLOSED EMBODIMENTS

Figure 1:
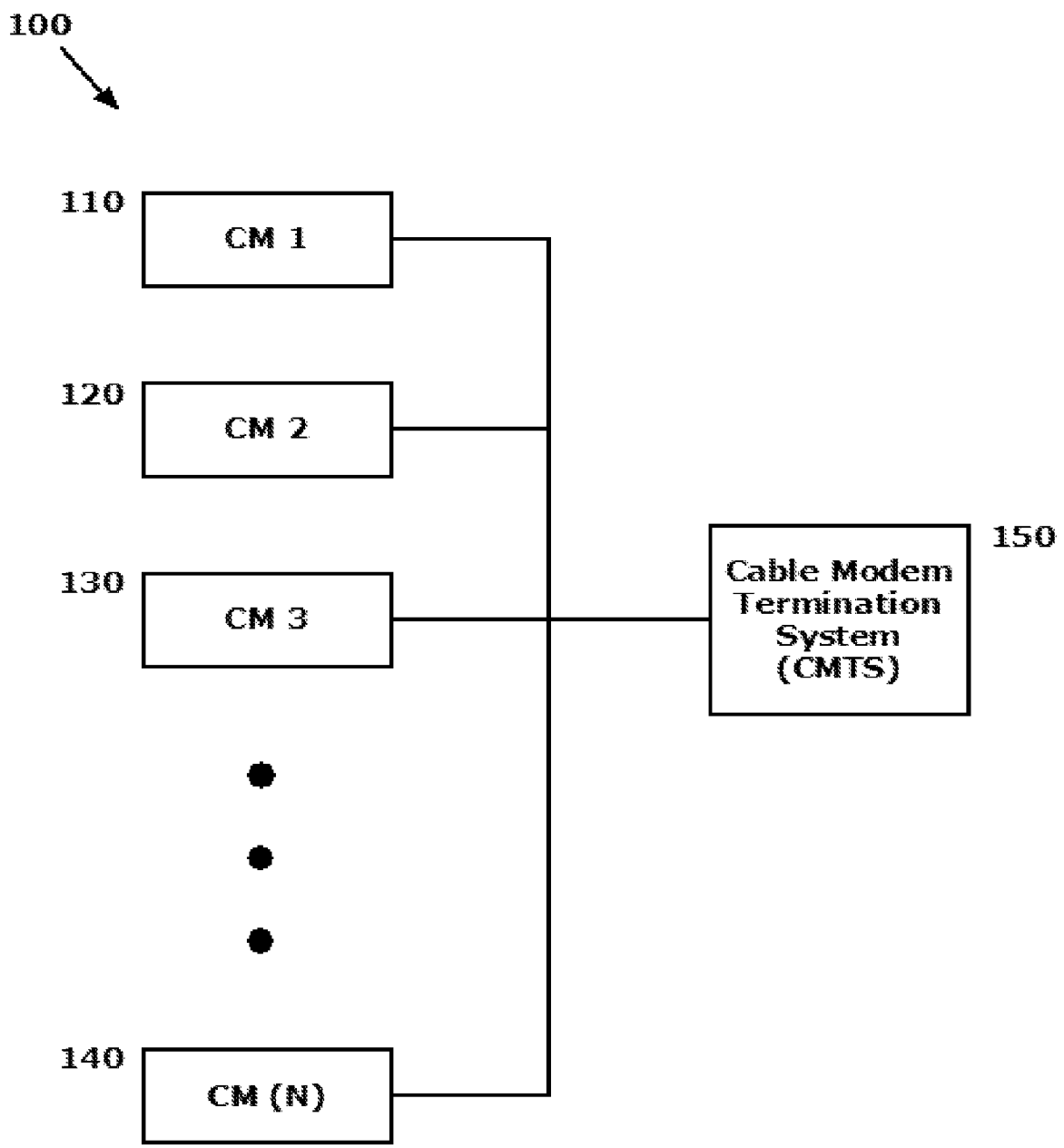
FIG. 1 illustrates a simple schematic representation of an exemplary cable system using an OFDMA uplink that may advantageously employ a PAPR reduction technique or scheme according to this disclosure.

Based on the above-described advantages and adaptability, OFDMA modulation today finds common use in digital communication systems, and has been proposed for the Uplink of DOCSIS standardization for the next generation hybrid fiber/coaxial cable systems.

One difficulty arising in proposed OFDMA implementations involves the PAPR of the transmit signal. This concern represents possibly a most significant disadvantage in the implementation of any multiple access OFDM-based protocol. Here it is clarified that, although the acronym "PAPR" may be used to describe different related phenomena or to represent different related terms, the acronym will be consistently used throughout this disclosure to connote "Peak-to-Average Power Ratio," and not "Peak-to-Average Power Reduction" or "Peak-to-Average ratio Reduction," as it is sometimes used in literature in the art. As will be described in detail below, the exemplary systems and methods described and disclosed herein are directed at "Peak-to-Average Power Ratio" reduction or PAPR reduction.

Those of skill in the art recognize that a number of strategies were tried to provide transmitter-side pre-processing in an effort to reduce a peak power associated with a transmit signal. One popular strategy to achieve PAPR reduction in an OFDM downlink is through the use of tone reservation in a manner similar to that done in Digital Video Broadcasting—Second Generation Terrestrial (DVB-T2) and Digital Video Broadcasting—Second Generation Cable (DVB-C2). In these implementation schemes, several OFDM subcarriers are left unused so that values can be set to these subcarriers in a scheme to reduce peak amplitudes of the overall OFDM signals. The several subcarriers (or tones) are used to produce lower amplitude transmit signals thereby reducing an overall peak power at the transmitter side. The data signal is carried over the active (non-reserved) subcarriers, while a signal level is selected for the arbitrary signals in the reserved subcarriers to effect the transmitter-side power reduction, thereby effecting PAPR reduction. No additional signal processing or processing overhead is required at the receiver-side based on the tone reservation scheme because this scheme operates with the series of "known" reserved subcarriers. The receiver is aware, or is made aware, of the positions of the reserved subcarriers and essentially ignores the signals in those reserved subcarriers.

In DVB-T2 and DVB-C2, there are a very large number of subcarriers, on the order of more than 10,000. In such implementations, the numbers of subcarriers that are reserved according to a tone reservation scheme represent a very small percentage of the overall number of available subcarriers.

In OFDMA Uplink systems, each cable modem has access to only a relatively very few subcarriers (for example, 32 subcarriers) of the OFDMA symbol, which makes tone reservation quite wasteful in capacity. Even reserving two subcarriers in such an implementation represents a significant increase in the percentage of available subcarriers dedicated to the tone reservation scheme, which may be quite unacceptable based on the amount of capacity loss. In this regard, some other PAPR reduction implementation is likely more appropriate.

A difficulty arises in that implementing other conventional PAPR reduction techniques, such as others of those that are employed in OFDM, often requires inclusion of side information to be transmitted alongside the OFDM signal. Those of skill in the art recognize that this OFDM PAPR reduction technique is not appropriate for OFDMA implementations as a reasonable ability to transmit side information simply does not exist.

The Long Term Evolution or LTE standard uses Single-Carrier FDMA (SC-FDMA) in the upstream. This technique realizes relatively lower PAPRs. However, capacity studies undertaken by the inventors indicated that SC-FDMA may not be the preferred technology for hybrid fiber/coaxial cable systems. This is so because, among other advantages, OFDMA is simpler to implement, provides a higher level of flexibility in the placement of data and pilot carriers and yields higher spectral efficiency than SC-FDMA. However, SC-FDMA is in effect a single-carrier transmission and has a very low PAPR which is very beneficial for reducing the power consumption in handsets.

Based on the foregoing, it would be advantageous to continue to employ OFDMA modulation in hybrid fiber/coaxial cable systems if a simplified scheme for achieving some reduction in PAPR can be implemented without large losses in overall data signal capacity.

Exemplary embodiments of the systems and methods according to this disclosure may implement a unique PAPR reduction technique or scheme (or algorithm) in OFDMA modulation for systems operated according to a DOCSIS standard.

Exemplary embodiments may achieve results similar to those attributable to tone reservation schemes in a manner that does not so negatively affect an amount of available data signal capacity.

Exemplary embodiments may be particularly adaptable to next generation cable gateways and/or next generation cable modems. These next generation cable gateways and/or cable modems may find particular utility in advanced hybrid fiber/coaxial cable systems. The adaptable cable gateways/modems may include a cable gateway system-on-chip (SOC) configuration.

Exemplary embodiments may provide a new technique or scheme for achieving PAPR reduction in OFDMA modulated systems. The disclosed techniques or schemes may also find applicability in OFDM modulated systems. For OFDM, however, the known tone reservation techniques or schemes also may be alternatively employed. The disclosed techniques or schemes may be useful for the downlink as well.

Exemplary embodiments, although developed to be specifically adaptable to hybrid fiber/coaxial cable systems, may provide techniques or schemes that may find equally advantageous application in other forms of digital communication, including in future wireless protocols.

Exemplary embodiments may accomplish PAPR reduction at levels comparable to conventional tone reservation techniques while not eating up a great amount of data signal capacity or significantly increasing processing power required for implementation. Exemplary embodiments may correspondingly achieve a comparatively low cost of implementation.

These and other features, and advantages, of the disclosed systems and methods are described in, or apparent from, the following detailed description of exemplary embodiments.

The disclosed systems and methods may implement a unique PAPR reduction technique or scheme for OFDMA modulation in a next generation cable gateway and/or next generation cable modem. These cable gateways and cable modems may include a cable gateway system-on-chip (SOC). The disclosed techniques or schemes may be implemented in systems based on the DOCSIS standard, and will generally refer to this specific utility for those techniques or schemes according to exemplary embodiments of the disclosed systems and methods. Exemplary embodiments described and depicted in this disclosure, however, should not be interpreted as being specifically limited to applicability to any particular communication standard or to communications via any particular gateway, modem, band or device. As is indicated briefly above, the disclosed systems and methods may find substantial applicability in other communication schemes, including wireless communication schemes and the like.

Specific reference to, for example, any particular gateway-centric or modem-centric system or device should be understood as being exemplary only, and not limiting, in any manner, to any particular class of devices, including cable gateways or cable modem devices. The systems and methods according to this disclosure will be described as being particularly adaptable to being hosted on a cable backbone, including a hybrid fiber/coaxial cable backbone that may provide, for example, a coaxial connection to a modem in a structure, but should not be considered as being limited to only such implementations, systems or devices.

Individual features and advantages of the disclosed systems and methods will be set forth in the description that follows, and will be, at least in part, obvious from the description, or may be learned by practice of the features described in this disclosure. The features and advantages of the systems and methods according to this disclosure may be realized and obtained by means of the individual elements, and combinations of those elements, as particularly pointed out in the appended claims. While specific implementations are discussed, it should be understood that this is done for illustration purposes only. A person skilled in the relevant art will recognize that other components and configurations may be used without departing from the spirit and scope of the subject matter of this disclosure.

It is conventionally understood that an amplitude probability density function of OFDM is Gaussian having a relatively large peak power compared to average power. The tone reservation algorithm used for PAPR reduction in DVB-T2 and DVB-C2 reserves about 1-2% of the subcarriers in the OFDM signal for PAPR reduction.

FIG. 1 illustrates a simple schematic representation of a cable system 100 using an OFDMA uplink that may advantageously employ a PAPR reduction technique or scheme according to this disclosure. As shown in FIG. 1, a plurality of cable modems (CM 1, CM 2, CM 3, CM (N)) 110-140 may be connected to a common cable modem base station or cable modem termination system or CMTS 150. Those of skill in the art recognize that the term "CMTS" typically refers to communications equipment located, for example, at a cable service provider's hub site facility. The CMTS 150 may be used to provide high speed data services, including cable Internet services, between the CMTS 150, as the cable modem base station, to the plurality of CMs 110-140 of individual cable customers or users to whom the cable service provider provides service. The CMTS 150 and the plurality of CMs 110-140 will typically all share a single OFDM symbol. The shared single OFDM symbol may consist, for example, of 4096 subcarriers and the sub-carriers may be 1024-level or 4096-level QAM. As such, each of the plurality of CMs 110-140 may, for example, be allocated 16 or 32 subcarriers.

This subcarrier allocation is at the root of the difficulty that it is one objective of the disclosed subject matter to address. Because each of the plurality of CMs 110-140 has access to only a relatively few of the subcarriers of the OFDM symbol, it is difficult to employ tone reservation for PAPR reduction with OFDMA. The burden of allocating even a small number of the subcarriers of each of the plurality of CMs 110-140 to tone reservation would have a significantly detrimental effect on the data throughput for the each of the plurality of CMs 110-140. For example, if each of the plurality of CMs has 32 subcarriers, achieving a reasonable PAPR reduction would require reserving two of the 32 subcarriers. This reservation would result in a significant (greater than 6%) reduction in capacity. This scenario regarding reduction in capacity is far worse in cases where one or more of the plurality of CMs 110-140 is provided access to only 16 of the subcarriers in the OFDMA symbol.

In order to deal with the unique nature of OFDMA modulation in this regard, new signal processing techniques or schemes are proposed. For clarity and ease of description, assume that the 32 subcarriers that are available to one of the plurality of CMs 110-140 are modulated with 4096-QAM such that according to the standard each subcarrier consists of 12 bits of information. There are, thus, 384 bits in the 32 subcarriers. The disclosed schemes allocate two pre-defined bits for each of four pre-defined subcarriers among the 32 subcarriers, or eight 8 bits in total, to be used for PAPR reduction. The four pre-defined subcarriers may be randomly spaced in any combination of indexes, e.g., indexes 5, 7, 22 and 29. There is an advantage in the disclosed PAPR reduction techniques or schemes that the four pre-defined subcarriers are not evenly spaced, or otherwise having a periodic component to the spacing. The total capacity loss under the proposed schemes is 8/384, which is approximately 2%, as the eight pre-defined bits are dedicated to PAPR reduction and are not available for data transmission. It should be recognized that this is but one exemplary implementation.

The two pre-defined bits for each of the four pre-defined subcarriers among the 32 subcarriers may be specified bit locations that are defined according to the standard. In this manner, the receiver would be configured to "know" of these locations. Ten bits in each of these subcarriers are dedicated to data and the other two bits to PAPR reduction. Different bit combinations (0/0, 0/1, 1/0 and 1/1) may be used for the reserved locations without making any difference to received data because the receiver simply discards these eight pre-defined reserved bits. Each combination (after the OFDM Inverse Fast Fourier Transform (IFFT)) will yield a different signal for transmission, i.e., four possible values for the IFFT as derived from possible combinations of the two bits reserved for PAPR reduction. A determination may be made as to which of the four IFFTs has a minimum peak, and which bit combination gives rise to that outcome. The bit combination for the two pre-defined bits in each of the four pre-defined subcarriers may then be set sequentially according to individual determinations carried out in the manner described above, i.e. choosing the minimum IFFT for each of the four pre-defined subcarriers such that the data signal is transmitted according to a determined lowest peak amplitude. This sequential search, determination and setting scheme may arrive at the optimal values for the PAPR reduction across the 32 subcarriers that comprise the data signal.

It is important to recognize that, while the disclosed techniques or schemes were developed to address implementations with small numbers of subcarriers, the disclosed techniques or schemes are not limited to these implementations and may find applicability to systems operating according to standards and modulation techniques with significantly larger numbers of subcarriers. Those implementations may find advantages in applying the disclosed schemes to their modulation techniques as well.

The transmitted signal, having less peak power, is friendlier toward the power amplifiers. This characteristic of the disclosed techniques or schemes makes them more compatible with implementations in cable modem applications. This characteristic, however, will also prove advantageous to use in wireless handsets and portable wireless devices as the handsets or devices may be operated at reduced power without sacrificing range.

According to the disclosed techniques or schemes, the receiver demodulates the signal according to known techniques. The receiver discards the two pre-defined bits each from the four pre-defined subcarriers, the values of these pre-defined bits having been set in the transmitter to minimize peak amplitude. The remaining bits are decoded according to known methods to recover the transmitted data from the transmitted signal. All of the signal processing according to the above-discussed techniques or schemes is undertaken without, for example, requiring any side information.

The above specifically-described techniques or schemes are presented as examples only. Deviations from the above-described techniques or schemes may include, for example, further reducing the signal overhead for the techniques or schemes. In the above example, two bits were indicated as being allocated in each of four subcarriers. Modifying that scheme is possible in allocating, for example, two bits of only two subcarriers. PAPR reduction is still achieved, but at a slightly less value than in above-described case. An advantage is that the accompanying capacity loss is reduced to only about 1%.

Returning to the above-described example in which two bits are pre-defined in each of four pre-defined subcarriers would yield, according to an exhaustive method, 4×4×4×4 or 256 combinations to be searched.

It should be noted that this disclosure includes schemes to reduce complexity in PAPR reduction. Significant to the disclosed subject matter is the reservation of individual bits in a plurality of subcarriers. The exhaustive method would apply an IFFT for every one of the 256 combinations to form the OFDMA signal. This would, of course, require 256 IFFTs in total, which is by most measures extremely computationally intensive. Furthermore, the complexity grows exponentially with the number of reserved bits. For example, if 16 bits are reserved for PAPR reduction, i.e. two bits each in eight subcarriers, the exhaustive method would require 65536 IFFTs.

According to the PAPR reduction techniques or schemes of this disclosure, exhaustive, complicated and extremely computationally-intensive methods of applying IFFTs to each of the possible/potential combinations of bits are avoided. According to the disclosed techniques or schemes, there may be two ways of extensively reducing complexity. Generally, these two ways involve independently searching for and isolating the pre-defined subcarriers, finding a minimum peak value for differing combinations of the PAPR reduction bits, and setting the PAPR reduction bits according to the findings.

A first method of reducing complexity may include Gray coding the pre-defined two bits in the pre-defined four subcarriers, i.e. Gray coding the pre-defined eight bits. Then only one of the pre-defined bits changes value from one combination to another. The disclosed scheme accounts for this change in the IFFT output via subtractions and additions. An example of this scheme may be as illustrated by the equations and the pseudo-code below:

```
IFFT (Combination (n + 1)) = IFFT (Combination (n) +
X̃_{k2}exp(j2πik_2/N) − X_{k1}exp(j2πik_1/N); i = 0 to N − 1
if (peak IFFT (Combination (n + 1)) < saved_peak)
{
    saved_peak = peak(IFFT (Combination (n + 1)))
    signal_to_transmit = IFFT (Combination (n + 1))
}
```

Here $\tilde{X}_{k2}$ and $X_{k1}$ are the subcarriers that are different from combination (n) and combination (n+1). Due to the Gray coding there will always be only one difference between one combination and the next. Because there may be up to four combinations per subcarrier, the indices $k_1$ and $k_2$ could be the same.

The above approach provides certain benefits over exhaustive methods. An alternative approach for achieving the benefits discussed above, e.g., reducing computations, is detailed below. It is this proposed PAPR reduction technique or scheme that may yield a greater increase in efficiency. Note again that the precedential conditions remain the same in that there are two pre-defined bits for each of four pre-defined subcarriers. In this manner, for each pre-defined subcarrier, there are four bit combinations as set forth in some detail above. This alternative approach independently searches for and isolates one of the pre-defined subcarriers. The proposed scheme then finds a minimum peak value for that one isolated subcarrier by applying the IFFT to each of the four bit combinations, and sets the bit combination for the one isolated subcarrier before moving to a search of the next of the four pre-defined subcarriers. In this manner, four searches are undertaken for the first of the pre-defined subcarriers, then four searches for the second of the pre-defined subcarriers and so on. As a result, 4×4, or sixteen, searches are conducted under the proposed PAPR reduction technique or scheme. This technique or scheme achieves a comparable result with a significant processing reduction.

Put another way, this method may make it possible to minimize the peak of the OFDMA signal independently for each of the pre-defined four subcarriers. In other words, the optimization problem may be made separable as to each of the pre-defined four subcarriers. The four-dimensional (4-D) optimization problem may be transformed into four one-dimensional (1-D) optimization problems. More generally, an M-dimensional optimization can be transformed into M one-dimensional optimizations. This is very efficient when a value of M is large (even when M is 4 as in the case of the exemplary disclosed scheme discussed above). This is explained in more detail below.

The disclosed systems and methods implement a PAPR reduction technique or scheme by first assessing the four possible/potential bit combinations for the two pre-defined constellation bits of the first pre-defined subcarrier and determine which combination out of the four possible/potential bit combinations gives the minimum peak amplitude after an IFFT. This combination may be denoted as C1. The scheme then holds this combination C1 for the first of the four pre-defined subcarriers and goes to the second of the four pre-defined subcarriers. From this, the disclosed scheme similarly determines the combination C2 of the two pre-defined bits of the second pre-defined subcarrier that gives the minimum peak amplitude after the IFFT. Then holding C1 and C2 for the first two pre-defined subcarriers the scheme proceeds to the third pre-defined subcarrier and finds the combination C3 of the two pre-defined bits for this subcarrier that gives the minimum peak amplitude after the IFFT. The scheme holds C1, C2 and C3 so determined for the first three predefined subcarriers and optimizes as C4 the two pre-defined bits of fourth pre-defined subcarrier. The final combination of pre-defined bits that is transmitted is the IFFT with the two pre-defined bits of the four pre-defined subcarriers set to C1, C2, C3 and C4.

This technique or scheme is powerful in achieving significant efficiencies by reducing a problem with exponential complexity into a problem with linear complexity. In the disclosed example, the search space is of an order 256. When one subcarrier at a time is optimized (each with four combinations), the search space for the four subcarriers is reduced to being of an order of 16. In considering a case of M subcarriers, the above technique or scheme reduces the search space from $2^{2M}$ to just 4M. Another useful combination will be the choice M=8. Then the search space of 65536 combinations is reduced to just 32. Hence, the disclosed method is useful in potentially extending the concept to larger OFDMA segments, or to OFDM with relatively large IFFT sizes.

In embodiments, additional computational simplifications may be realized especially for OFDMA. If each cable modem in a system modulates only 32 subcarriers of a 4096-point OFDMA symbol, the disclosed scheme can work with a smaller IFFT, e.g., of size 128, during the process of optimization. After obtaining the optimum set {Ck}, the complete IFFT may be taken. These are factors that may be taken into account to optimize practical implementation, hardware or software, of an implementing algorithm.

It should be recognized that it may be preferable to set the two pre-defined bits of each of the four pre-defined subcarriers as the most significant bits (MSBs) in those subcarriers. For example, in the case of 4096-QAM, bits b11 and b10 may be the two pre-defined bits reserved for PAPR reduction. In such an implementation, toggling bit b11 changes the sign of the Y component of the constellation point and toggling b10 changes the sign of the X component of the constellation point. Therefore, analyzing the four combinations of bits {b11, b10} makes the subcarrier go through its four "largest," or otherwise most significant, value variations. One may expect a loss of performance through the allocation of MSBs as the pre-defined bits for PAPR reduction. This has been investigated through simulation and the performance loss has been quantified as 0.1 dB, which is small enough to be considered negligible.

The PAPR reduction achieved by the disclosed schemes has been shown in simulations to be better than the corresponding reduction achieved in, for example, DVB-T2 through the tone reservation technique for OFDMA. In simulations, PAPR reductions gains that can be obtained by allocating four and eight subcarriers for PAPR reduction have been determined to be generally equivalent to or better than those that are achievable according to conventional means. Also, the scheme may trade capacity for PAPR reduction. Note that in each subcarrier only two bits are allocated for PAPR reduction. The remaining bits of the subcarriers contain normal data.

Objectives and/or advantages of implementing the disclosed techniques or schemes for PAPR reduction may include the following. The disclosed technique or scheme may achieve good PAPR reduction with OFDMA even when the number of subcarriers allocated to a cable modem or handset is relatively small. Capacity overhead to implement the disclosed technique or scheme and to achieve the good PAPR reduction is minimal Computational complexity in implementing the disclosed technique or scheme for achieving good PAPR reduction is realized by transforming an M-dimensional optimization into M one-dimensional optimizations, i.e. , an exponential complexity problem is mapped into a linear complexity problem. The disclosed technique or scheme improves on a tone reservation method, which does not work efficiently for OFDMA when the number of subcarriers allocated to a cable modem or handset is small. The disclosed technique or scheme may be extended for OFDM as an alternative to a tone reservation algorithm even as the number of subcarriers may increase dramatically.

Note that the disclosed technique or scheme has been explained through examples, which are non-limiting.

Figure 2:
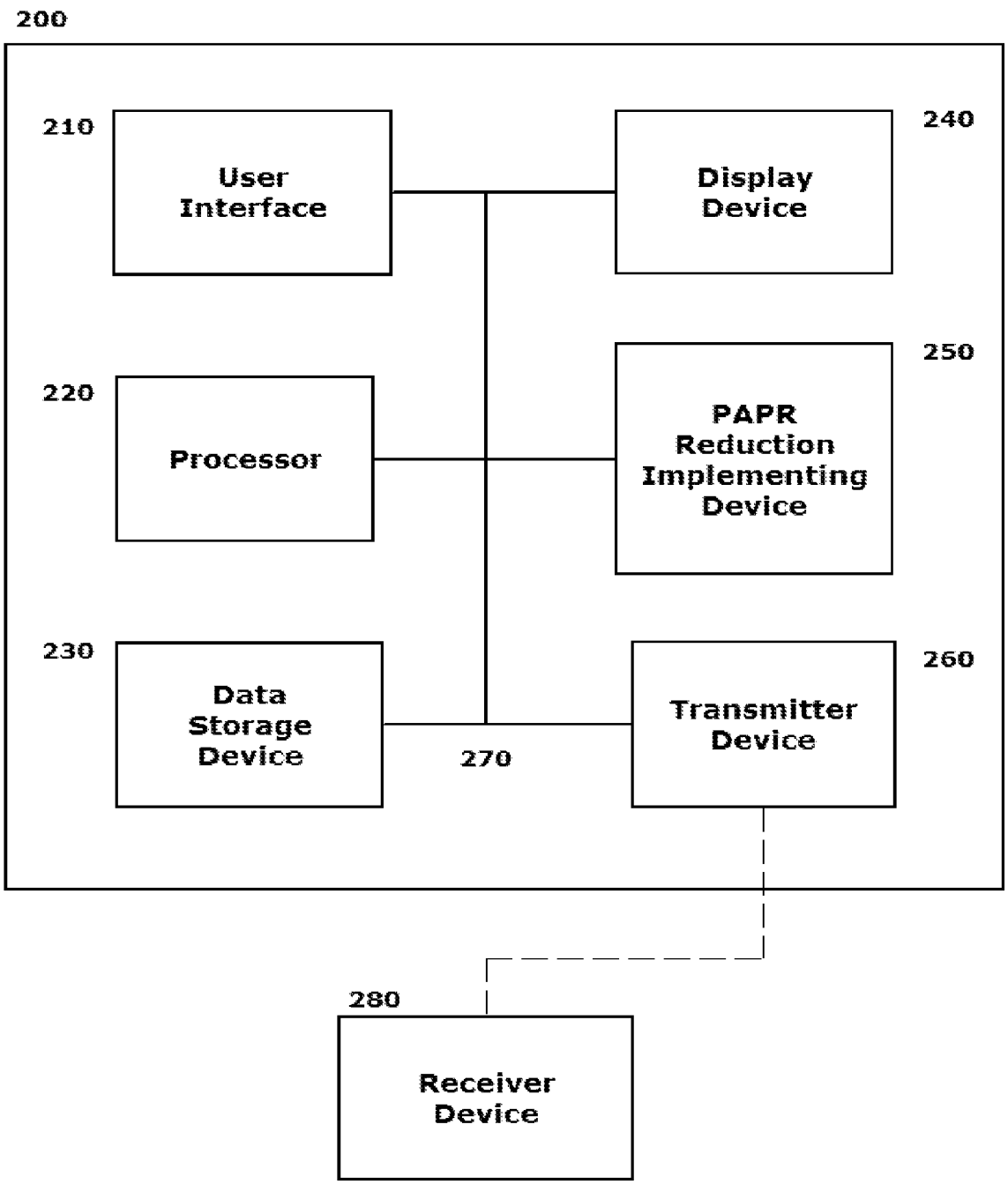
FIG. 2 illustrates a block diagram of an exemplary system for implementing a PAPR reduction technique or scheme according to this disclosure.

FIG. 2 illustrates a block diagram of an exemplary system 200 for implementing a PAPR reduction technique or scheme according to this disclosure.

The exemplary system 200 may include a user interface 210 by which the user can communicate with the exemplary system 200, and initiate operations of the exemplary system 200 for implementing the disclosed PAPR reduction technique or scheme. It is recognized that the PAPR reduction technique or scheme may be automatically applied by the exemplary system 200 to a data signal prior to transmission from a transmitter device 260. Otherwise or additionally, the PAPR reduction technique or scheme may be manipulated by a user of the exemplary system 200 according to a user input via the user interface 210. The user interface 210 may be configured as one or more conventional mechanisms that permit a user to input information to the exemplary system 200. The user interface 210 may include, for example, an integral keyboard, or a touchscreen with "soft" buttons for communicating commands and information to the exemplary systems 200. The user interface 210 may alternatively include a microphone by which a user may provide oral commands to the exemplary system 200 to be "translated" by a voice recognition program or otherwise. The user interface 210 may otherwise include any other like device for user operation of, and data exchange with, the exemplary system 200. A user may make inputs via the user interface 210 to simply turn the exemplary system 200 ON thereby initiating a PAPR reduction technique or scheme for the exemplary system 200.

The exemplary system 200 may include one or more local processors 220 for individually undertaking the processing and control functions that are carried out by the exemplary system 200. Processor(s) 220 may include at least one conventional processor or microprocessor that interprets and executes instructions and processes for pre-processing a data transmission signal according to the disclosed PAPR reduction technique or scheme.

The exemplary system 200 may include one or more data storage devices 230. Such data storage device(s) 230 may be used to store data, and operating programs or applications to be used by the exemplary system 200, and specifically the processor(s) 220. Data storage device(s) 230 may include a random access memory (RAM) or another type of dynamic storage device that stores information and instructions for execution by the processor(s) 220. Data storage device(s) 230 may also include a read-only memory (ROM), which may include a conventional ROM device or another type of static storage device that stores static information and instructions for execution by the processor(s) 220. The data storage device(s) 230 will generally be those that are integral to the exemplary system 200. Otherwise, the data storage device(s) 230 may include a remote data storage device external to the exemplary system 200 that is in data communication with the exemplary system 200. At least one of the data storage devices may be usable to store implementing instructions for the PAPR reduction technique or scheme to be carried out by the exemplary system 200 or another communicating device, such as a cable modem, with which the exemplary system 200 may be associated, in the manner discussed above.

The exemplary system 200 may include at least one data display device 240, which may be configured as one or more conventional mechanisms that display information to the user of the exemplary system 200 for operation of the exemplary system 200 in its various operating modes, or otherwise for displaying, for example, usable information on a status of the operation of the PAPR reduction technique or scheme by the exemplary system 200.

The exemplary system 200 may include a PAPR reduction implementing device 250. The PAPR reduction implementing device 250 may be a specific component that may operate in conjunction with the processor(s) 220 and/or that may use information, such as data, stored in the data storage device(s) 230, or that may operate autonomously according to stored information and/or internal programming in the PAPR reduction implementing device 250 itself. The PAPR reduction implementing device 250 may alternatively be a function of at least one of the processor(s) 220. The PAPR reduction implementing device 250 may be specifically programmed, or otherwise used, to format signals to be transmitted, for example, by a transmitter device 260 according to the disclosed techniques or schemes.

The exemplary system 200 may include a transmitter device 260 that may be a cable modem, or may be another device configured to operate according to a DOCSIS standard or implementing an OFDMA modulation, or both. The transmitter device 260 may transmitted a set of subcarriers with a plurality of PAPR reduction bits to a receiver device 280. The transmitter device 260 may be in or associated with the exemplary system 200. Conversely, exemplary system may be in, or associated with the transmitter device 260, such as, for example, a cable modem.

All of the various components of the exemplary system 200, as depicted in FIG. 2, may be connected by one or more data/control busses 270. The data/control bus(ses) 270 may provide internal wired or wireless communication between the various components of the exemplary system 200, as all of those components are housed integrally in the exemplary system 200, or are housed separately and in wired or wireless communication with the exemplary system 200.

It is anticipated that the various disclosed elements of the exemplary system 200 may be arranged in combinations of sub-systems as individual components or combinations of components. All of the depicted components may be integral to a single unit that is exemplary system 200, and include one or more transmitter device(s) 260. Otherwise, individual components, or combinations of components, may be separately presented and in wired or wireless communication with other of the individual components of the exemplary system 200, or with the one or more transmitter device(s) 260. In other words, no specific configuration as an integral unit including one or more transmitter device(s) 260, or as a separate support unit associated with one or more transmitter device(s) 260, for the exemplary system 200 is to be implied by the depiction in FIG. 2.

Figure 3:
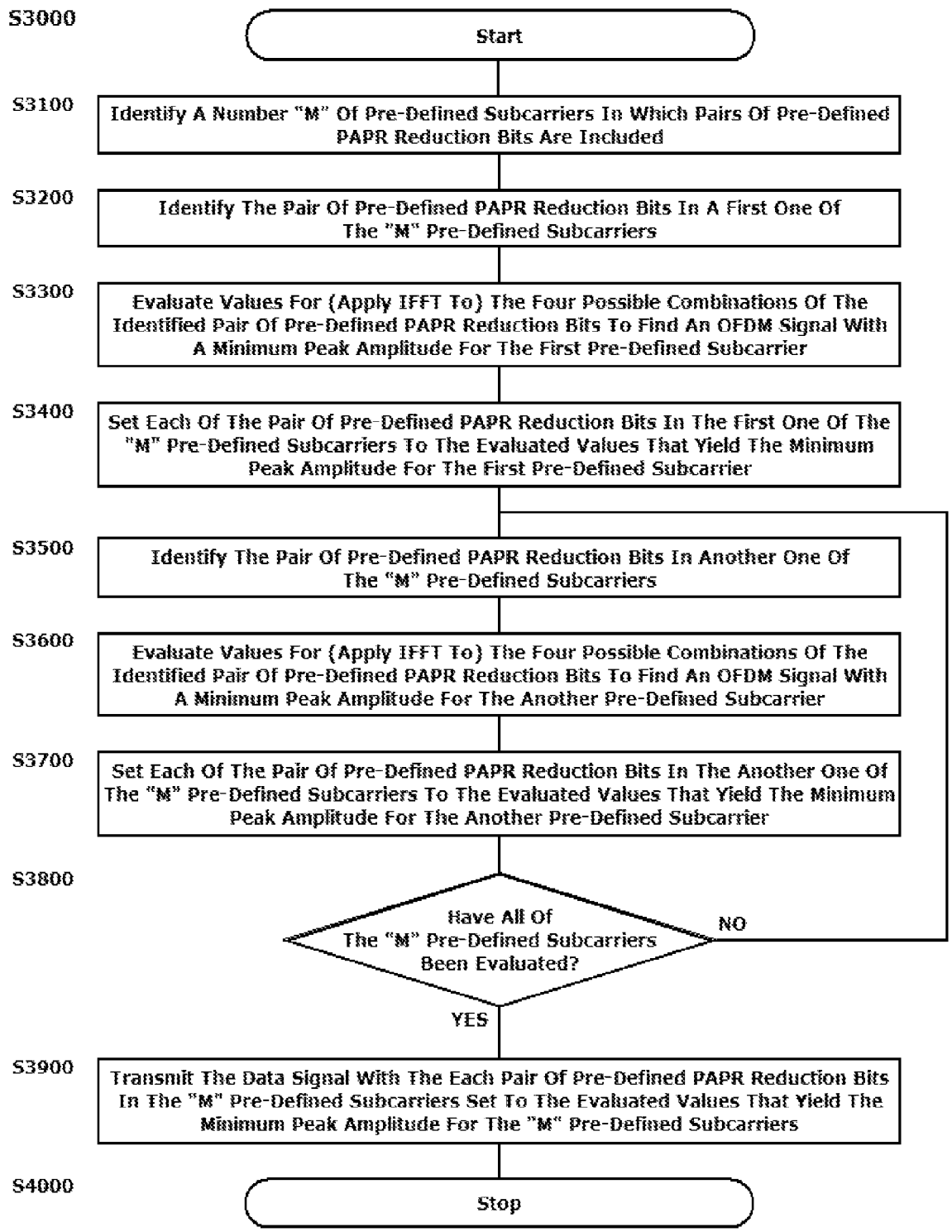
FIG. 3 illustrates a flowchart of an exemplary method for implementing a PAPR reduction technique or scheme according to this disclosure.

The disclosed embodiment may include an exemplary method for implementing a PAPR reduction technique or scheme according to this disclosure. FIG. 3 illustrates a flowchart of such an exemplary method. As shown in FIG. 3, operation of the method commences at Step S3000 and proceeds to Step S3100.

In Step S3100, a number "M" of pre-defined subcarriers in which pairs of pre-defined PAPR reduction bits are included may be identified. Operation of the method proceeds to Step S3200.

In Step S3200, the pair of pre-defined PAPR reduction bits in a first one of the "M" pre-defined subcarriers may be identified. Operation of the method proceeds to Step S3300.

In Step S3300, the four possible combinations of values for the identified pair of pre-defined PAPR reduction bits may be individually evaluated by, for example, applying an IFFT to determine the combination of bits that yields a minimum peak amplitude for the first one of the "M" pre-defined subcarriers. Operation of the method proceeds to Step S3400.

In Step S3400, each of the pair of pre-defined PAPR reduction bits in the first one of the "M" subcarriers may be set to the values that are evaluated to yield the minimum peak amplitude for the first one of the "M" pre-defined subcarriers. Operation of the method proceeds to Step S3500.

In Step S3500, the pair of pre-defined PAPR reduction bits in another one of the "M" pre-defined subcarriers may be identified. Operation of the method proceeds to Step S3600.

In Step S3600, the four possible combinations of values for the identified pair of pre-defined PAPR reduction bits may be individually evaluated by, for example, applying an IFFT to determine the combination of bits that yields a minimum peak amplitude for the another one of the "M" pre-defined subcarriers. Operation of the method proceeds to Step S3700.

In Step S3700, each of the pair of pre-defined PAPR reduction bits in the another one of the "M" subcarriers may be set to the values that are evaluated to yield the minimum peak amplitude for the another one of the "M" pre-defined subcarriers. Operation of the method proceeds to Step S3800.

Step S3800 is a determination step. In Step S3800, it is determined whether all of the "M" pre-defined subcarriers have been evaluated.

If in Step S3800, it is determined that all of the "M" pre-defined subcarriers have not been evaluated, operation of the method reverts to Step S3500.

If in Step S3800, it is determined that all of the "M" pre-defined subcarriers have been evaluated, operation of the method proceeds to Step S3900.

In Step S3900, a data signal with all of the pairs of pre-defined PAPR bits set to the evaluated values that yield the minimum peak amplitude for each of the "M" pre-defined subcarriers may be transmitted from a transmitter-side device. Operation of the method proceeds to Step S4000, where operation of the method ceases.

The disclosed embodiments may include a non-transitory computer-readable medium storing instructions which, when executed by a processor, may cause the processor to execute the steps of a method as outlined above.

The above-described exemplary systems and methods reference certain conventional "known" methods or components to provide a brief, general description of suitable communication and processing environments in which the subject matter of this disclosure may be implemented for familiarity and ease of understanding. Although not required, embodiments of the disclosure may be provided, at least in part, in a form of hardware circuits, firmware or software computer-executable instructions to carry out the specific functions described, including as program modules to be executed by a processor that may execute the disclosed scheme for implementing a PAPR reduction technique or scheme. Generally, program modules are understood to include routine programs, objects, components, data structures, and the like that perform particular tasks or implement particular data types in support of a specific function such as the disclosed implementing function.

Those skilled in the art will appreciate that other embodiments of the disclosed subject matter may be practiced in communication environments according to established cable networks. The disclosed communication schemes may be executed with many types of communicating devices, which may include, but are not limited to, cable gateways, cable modems and with many different fixed, semi-fixed, or mobile classes and configurations of communication equipment and/or computing systems.

Embodiments may be practiced in distributed network communication environments where tasks are performed by local processing systems and devices, generally as outlined above, some components of which may be linked to each other by hardwired links, wireless links, or a combination of the two through a cooperating communication network. In a distributed network environment, program modules, and any stored data or programs, may be located in both local and remote data storage devices.

As indicated briefly above, embodiments according to this disclosure may also include computer-readable media having stored computer-executable instructions or data structures recorded thereon that can be accessed, read and executed by a particular module or device, or system, in, for example, a mobile or fixed communicating device. Such computer-readable media can be any available media that can be accessed by a processor in, or in communication with, such a device executing a PAPR reduction technique or scheme. By way of example, and not limitation, such computer-readable media can comprise RAM, ROM, EEPROM, CD-ROM, DVD-ROM, flash drives, thumb drives, data memory cards or other analog or digital data storage devices that can be used to carry or store desired program elements or steps in the form of accessible computer-executable instructions and/or data structures. When information is transferred or provided over a network or another communications connection the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause communicating components, including wireless communicating components, or processors associated with such components, to perform certain of the above-specified functions, individually or in combination. Computer-executable instructions also include program modules that are remotely stored for access by a communicating device or system to be executed by processors in the communicating device or system when the communicating device or system is caused to communicate across any available communication link, particularly those described in exemplary manner above.

The exemplary depicted sequence of executable instructions, or associated data structures for executing those instructions, represents one example of a corresponding sequence of acts for implementing the functions described in the steps. The steps of the method, as depicted in FIG. 3, are not intended to imply that all of the depicted and described steps must be executed as part of a complete method, or that the steps must be executed in any particular order, except as may be necessarily inferred when one of the depicted and described steps is a necessary precedential condition to accomplishing another of the depicted and described steps. The depicted and described steps, where appropriate, may be executed in series or in parallel.

Although the above description may contain specific details, these details should not be construed as limiting the claims in any way. Other configurations of the described embodiments of the disclosed systems and methods are part of the scope of this disclosure. For example, the principles of the disclosure may be applied to each individual communicating device where each individual communicating device may independently operate according to the disclosed system constraints or method steps. This enables each user of a separate communicating device to use the benefits of the disclosure even if any one of the large number of possible applications do not need a specific aspect of the functionality described and depicted in this disclosure. In other words, there may be multiple instances of the separate communicating devices, including cable modems, each processing signal content in various possible ways to effect the disclosed PAPR reduction techniques, schemes, processes, methods or algorithms. The disclosed system does not necessarily need to be one single system, networked or otherwise, used by all end users or undertaken identically by each communicating device or system, cable gateway, cable modem or the like.

Accordingly, the appended claims and their legal equivalents should only define the disclosure, rather than any of the specific examples given.

We claim:

1. A communicating system, comprising:
a first communicating device; and
a processing device associated with the first communicating device, the processing device being programmed to
identify bits in a plurality of subcarriers of a data signal that are set for peak-to-average power ratio (PAPR) reduction;
determine which values for the PAPR reduction bits in each of the plurality of subcarriers yield a smallest peak amplitude for the each of the plurality of subcarriers;
set the PAPR reduction bits to the determined values;
determine a number M of the plurality of subcarriers that include PAPR reduction bits: and
sequentially identify, evaluate and set the PAPR reduction bits for a first and subsequent one of the plurality of subcarriers until the PAPR reduction bits in all of the number M subcarriers are set.

2. The communicating system of claim 1, the plurality of subcarriers being pre-defined.

3. The communicating system of claim 2, the PAPR reduction bits in the plurality of subcarriers being a pre-defined pair of bits in at least one of the plurality of pre-defined subcarriers.

4. The communicating system of claim 1, the first communicating device transmitting a data signal that includes the plurality of subcarriers with the PAPR reduction bits in each of the plurality of subcarriers set to the determined values.

5. The communicating system of claim 1, the PAPR reduction bits in each of the plurality of subcarriers being most significant bits in each of the plurality of subcarriers.

6. The communicating system of claim 1, the plurality of subcarriers being randomly located in a data symbol.

7. The communicating system of claim 1, the processing device determining which values for the PAPR reduction bits in each of the plurality of subcarriers yield the smallest peak amplitude for the each of the plurality of subcarriers by applying an Inverse Fast Fourier Transform to each combination of values for the PAPR reduction bits.

8. The communicating system of claim 1, the first communicating device employing Orthogonal Frequency-Division Multiple Access modulation.

9. The communicating system of claim 1, the first communicating device being one of a cable modem and a cable gateway.

10. The communicating system of claim 9, the one of the cable modem and cable gateway operating according to a Data Over Cable Service Interface Specification standard.

11. A method to reduce a peak-to-average power ratio (PAPR), comprising:
identifying bits in a plurality of subcarriers of a data signal that are set for PAPR reduction;
determining, with a processor, which values for the PAPR reduction bits in each of the plurality of subcarriers yield a smallest peak amplitude for the each of the plurality of subcarriers;
setting the PAPR reduction bits to the determined values;
transmitting, with a first communicating device, the data signal that includes the plurality of subcarriers with the PAPR reduction bits in each of the plurality subcarriers set to the determined values;
determining a number M of the plurality of subcarriers that include PAPR reduction bits; and sequentially executing the identifying, the evaluating and the setting of the PAPR reduction bits for a first and subsequent one of the plurality of subcarriers until the PAPR reduction bits in all of the number M of subcarriers are set.

12. The method of claim 11, the plurality of subcarriers being pre-defined.

13. The method of claim 12, the PAPR reduction bits in the plurality of subcarriers being a pre-defined pair of bits in at least one of the plurality of pre-defined subcarriers.

14. The method of claim 11, the data signal being received by a second communicating device, the data signal being processed by the second communicating device by discarding the PAPR reduction bits in the plurality of subcarriers.

15. The method of claim 11, the PAPR reduction bits in each of the plurality of subcarriers being most significant bits in each of the plurality of subcarriers.

16. The method of claim 11, the plurality of subcarriers being randomly located in a data symbol.

17. The method of claim 11, the determining which values for the PAPR reduction bits in each of the plurality of subcarriers yield the smallest peak amplitude for each of the plurality of subcarriers comprising applying an Inverse Fast Fourier Transform to each combination of values for the PAPR reduction bits.

18. The method of claim 11, the data signal employing Orthogonal Frequency-Division Multiple Access modulation.

19. The method of claim 11, the first communicating device being one of a cable modem and a cable gateway.

20. The method of claim 19, the one of the cable modem and cable gateway operating according to a Data Over Cable Service Interface Specification standard.

21. A non-transitory computer-readable medium storing computer-readable instructions which, when executed by a processor, cause the processor to execute a method to reduce a peak-to-average power ratio (PAPR), comprising:
identifying bits in a plurality of subcarriers of a data signal that are set for PAPR reduction;
determining which values for the PAPR reduction bits in each of the plurality of subcarriers to determine which values for the PAPR reduction bits yield a smallest peak amplitude for the each of the plurality of subcarriers;
setting the PAPR reduction bits to the determined values;
directing transmitting, with a first communicating device, of the data signal that includes the plurality of subcarriers with the PAPR reduction bits in each of the plurality of subcarriers set to the determined values;
determining a number M of the plurality of subcarriers that include PAPR reduction bits; and
sequentially executing the identifying, the evaluating and the setting of the PAPR reduction bits for a first and subsequent one of the plurality of subcarriers until the PAPR reduction bits in all of the number M of subcarriers are set.

22. The non-transitory computer-readable medium of claim 21, the plurality of subcarriers being pre-defined.

23. The non-transitory computer-readable medium of claim 22, the PAPR reduction bits in the plurality of subcarriers being a pre-defined pair of bits in at least one of the plurality of pre-defined subcarriers.

24. The non-transitory computer-readable medium of claim 21, the data signal being received by a second communicating device, the data signal being processed by the second communicating device by discarding the PAPR reduction bits in the plurality of subcarriers.

25. The non-transitory computer-readable medium of claim 21, the PAPR reduction bits in each of the plurality of subcarriers being most significant bits in each of the plurality of subcarriers.

26. The non-transitory computer-readable medium of claim 21, the plurality of subcarriers being randomly located in a data symbol.

27. The non-transitory computer-readable medium of claim 21, the determining which values for the PAPR reduction bits in each of the plurality of subcarriers yield the smallest peak amplitude for each of the plurality of subcarriers comprising applying an Inverse Fast Fourier Transform to each combination of values for the PAPR reduction bits.

28. The non-transitory computer-readable medium of claim 21, the data signal employing Orthogonal Frequency-Division Multiple Access modulation.

29. The non-transitory computer-readable medium of claim 21, the first communicating device being one of a cable modem and a cable gateway.

30. The non-transitory computer-readable medium of claim 29, the one of the cable modem and cable gateway operating according to a Data Over Cable Service Interface Specification standard.

* * * * *